Aug. 15, 1967

A. SCHIFFERS 3,335,868

FILTERS FOR THE DIRECT FILTRATION OF WATER

Filed Oct. 19, 1966

Ansgar Schiffers,
Inventor

By Wenderoth, Lind and Ponack
Attorneys

Aug. 15, 1967   A. SCHIFFERS   3,335,868
FILTERS FOR THE DIRECT FILTRATION OF WATER
Filed Oct. 19, 1966   3 Sheets-Sheet 2

3,335,868
FILTERS FOR THE DIRECT FILTRATION OF WATER
Ansgar Schiffers, Aachen, Germany, assignor to Societe Degremont Societe Anonyme, Rueil, Seine-et-Oise, France
Filed Oct. 19, 1966, Ser. No. 587,830
Claims priority, application Germany, Oct. 25, 1965, D 48,499
15 Claims. (Cl. 210—274)

Multiple-purpose water filtration apparatus are already known in various forms of embodiment. More particularly, double filters are known which are commonly used for filtering cooling water, raw water and the like (which will be hereinafter referred to as "raw water"). Such double filters comprise a lower, coarse-granulation filtering layer, equipped with a raw-water inlet manifold, and two fine-granulation filtering layers overlying said coarse-granulation layer and separated from each other by draining means adapted to remove the filtered water flowing through said fine-granulation layers in countercurrent relationship to the raw-water stream, that is, up and downwards.

Filters of this general type are capable of operating efficiently during relatively long time periods. The filtration process takes place in the upward direction (firstly through the coarse-granulation filtering layer and then through the fine-granulation filter superposed thereto) at a filtration rate of the order of 80 to 130 feet/hr. The coarse-granulation filtering layer consists of relatively large-sized gravels through which a certain pre-filtration takes place, that is, the removal of relatively large particles of fatty materials. If this coarse-granulation filtering layer were simply replaced by a fine-granulation filtering layer, the upper layer of fine gravel would on the one hand rapidly become exhausted due to the relatively high velocity of flow of the water being treated, and on the other hand be carried along by the water. It is for this reason that an upper layer of fine-granulation filtering layer is provided through which a circulation of raw water, that is, water flowing downwards from the level where the draining means are disposed is maintained thus reducing practically to zero the pressure difference. In filters of this character the coarse-granulation filtering layer and the next, fine-granulation filtering layer receive therethrough the main quantity of water, that is, about 90%, the upper fine-granulation filtering layer filtering at the most only 10% or less. Therefore, the filtration rate of the upper fine-granulation filtering layer should remain as low as possible for the pre-filtration also takes place in the fine-granulation filtering layer and should lead to a rapid increase in the pressure drop and, therefore, a rapid decrease in the quantity of water circulating through this layer. Now adding an upper layer of gravel above the upper fine-granulation filtering layer cannot reasonably be contemplated, for during the back-rinsing of the filter assembly the heavier gravel would sink in the apparatus, thus making the upper fine-granulation filtering layer completely useless.

It is the object of the present invention to modify a filter of the basic type set forth hereinabove with a view to improve the filter efficiency, this improvement being as high as 100% without utilizing any additional filtering material.

This invention is concerned with a filter for filtering water which consists of a lower, coarse-granulation filtering layer equipped with a raw-water inlet manifold, and of two upper, fine-granulation filtering layers overlying said coarse-granulation layer and separated from each other by draining means adapted to remove the filtered water flowing through the assembly in counter-current relationship to the raw water supply. This invention consists in that the raw water to be filtered is delivered exclusively from beneath the coarse-granulation filtering layer, due to the provision of complementary draining means associated with said coarse-granulation filtering layer, and also in that these complementary draining means are connected to a pipe line adapted to direct one fraction of the pre-filtered raw water from said coarse-granulation filtering layer to the top of the upper fine-granulation filtering layer, the remaining fraction of pre-filtered water being caused to flow through the fine-granulation filtering layer disposed just above said coarse-granulation layer. Referring more particularly to the draining means, a preferred form of embodiment of this invention is characterised in that the draining device associated with the coarse-granulation filtering layer lies in the interface between said coarse-granulation filtering layer and the lower fine-granulation filtering layer. However, if desired this draining device may be disposed within the coarse-granulation filtering layer.

The filter arrangement according to this invention, as contrasted with hitherto known structures of this character, utilizes for filtering purpose the whole of the lower and upper fine-granulation filtering layers, and is characterised in that one fraction of the raw water to be filtered which corresponds substantially to about 50% of the total amount of water to be filtered, is caused to flow through the aforesaid complementary draining device after the filtration of said fraction through said coarse-granulation filtering layer, this fraction being subsequently directed towards the top of the upper fine-granulation filtering layer to complete the filtering process. The remaining fraction is filtered in the lower, fine-granulation filtering layer in which this fraction circulates in countercurrent relationship. Thus, the filtration efficiency of the device may be improved by about 100% without increasing the velocity of flow through the upper fine-granulation filtering layers, as contrasted with hitherto known "additional" and double filters. Thus, by simply adding a complementary draining device and providing the above-described water distribution, a considerably higher filtration efficiency can be obtained under the same over-all dimensions. The optimum ratio is obtained by combining the above-mentioned means with the use of two fine-granulation filtering layers consisting of filter sand of fine homogeneous particle size, which normally compares numerically with sand for filtering layer. Preferably, a filtering layer having either a single particle size or particle sizes kept within very narrow limits will be used to this end. In this respect, it is advisable to arrange the assembly in such a manner that in combination therewith the fine-granulation filtering layers consist of filter sand having a very homogeneous granulometry.

More particularly, the filter according to this invention may be constructed in various ways to permit the back-rinsing thereof in a simple manner. In this respect, there is provided, in connection with the back-rinsing operation, a preferred form of embodiment of this invention which is characterised in that a back-rinsing air inlet manifold disposed beneath the coarse-granulation filtering layer is connected to a rinsing-water outlet overlying the upper fine-granulation filtering layer, so that this back-rinsing may be effected by injecting raw water and air into the apparatus. Under these conditions, the back-rinsing operation takes place with an upward flow; on the other hand, it is advantageous, from the point of view of the filter supervision and control, to so arrange the component elements of the filter that the draining devices or means be normally interconnected through gate valves inserted in the raw-water pipe lines. For the same reasons, the raw-water supply line may be connected through gate valves to the pipe line provided for directing the above-defined pre-filtered fractional stream towards the top of the upper fine-granulation filtering layer. The filter arrangement according to this invention will be particularly simple as far as the coupling and mounting technique is concerned, if care is taken to connect the rinsing water outlet line, upstream of a gate valve, stop-cock or the like, to the aforesaid pipe line provided for directing the pre-filtered water to the top portion of the upper fine-granulation filtering layer.

By properly arranging the various filtering layers the upper and lower fine-granulation filtering layers may be caused to filter about 50% of the total amount of water to be treated, which corresponds to an increment of the order of 100% in comparison with the filtration efficiency of hitherto known devices. In this respect it may be advantageous to so select the filter arrangement as to insert adjustable or adjustment valves in the raw-water supply line and in the line directing the pre-filtered water to the top of the upper fine-granulation filtering layer, to permit the adjustment at will of two fragmentary streams flowing through the lower fine-granulation filtering layer and/or the upper fine-granulation filtering layer. Moreover, measuring units may be inserted in said pipe lines for checking the throughput and pressure values, the aforesaid valves being mounted in the corresponding adjustment circuits.

The advantages deriving from the present invention lie essentially in the increment of filtering efficiency, as already explained hereinabove, which is obtained without using additional apparatus or means and without overstepping the additional filtration rates in the fine-granulation filtering layers notably by the use of fine-granulation filtering layers consisting of sand having a very homogeneous particle size.

The above-mentioned features and other specific features of the filter according to this invention will become more apparent as the following description proceeds with reference to the attached drawing in which.

Figure 1:
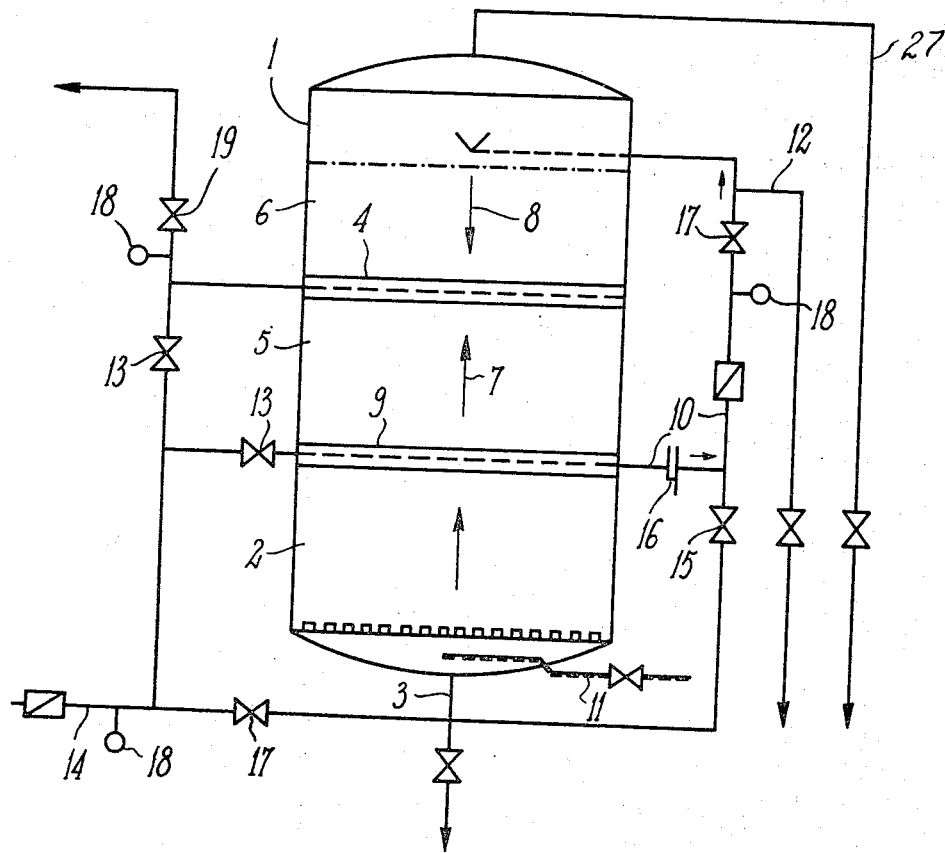
FIGURE 1 shows diagrammatically a filter structure according to this invention, equipped with the corresponding pipe lines and valves.
Figure 2:
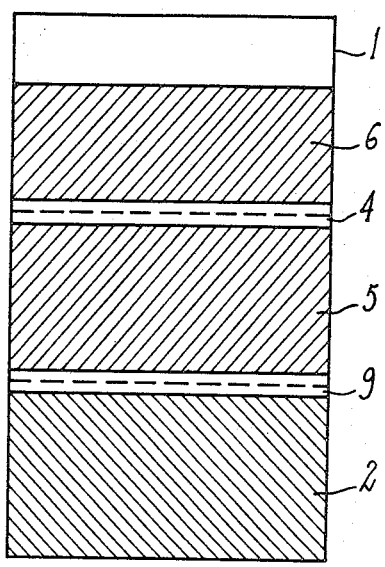
FIGURE 2 shows the superposed arrangement of the filtering layers in the filter of this invention.

The filter structure 1 illustrated in the drawing is designed for filtering water (cooling water, raw water or the like, to be hereinafter referred to as "raw-water"). It comprises, in its basic arrangement, a lower, coarse-granulation filtering layer 2 having a raw-water inlet manifold 3 associated therewith, and two fine-granulation filtering layers 5 and 6 overlying said coarse-granulation layer 2 and separated by a draining device 4 adapted to remove the filtered water, the water to be filtered flowing through said fine-granulation layers in opposite directions as shown by the arrows 7 and 8. The fine layers 5 and 6 consist of particles having a homogeneous grain size and preferably of filtering layers made of calibrated particles. All the filtering layers 2, 5 and 6 are contained in a common vessel 1.

According to this invention, during the treatment of raw water all the water is supplied to the apparatus beneath said coarse-granulation filtering layer 2. Normally, a complementary draining device or manifold 9 is provided between this coarse layer 2 and the overlying fine-granulation filtering layer 5. This complementary draining device is connected to a pipe line 10 adapted to direct one fraction of the pre-filtered raw water from the coarse-granulation layer 2 to the top of the upper fine-granulation filtering layer 6, the remaining fraction of pre-filtered water flowing through the lower fine-granulation filtering layer 5 overlying the coarse-granulation filtering layer 2.

Underlying the coarse-granulation filtering layer 2 is another manifold 11 for introducing back-rinsing air, and overlying the upper fine-granulation filtering layer 6 is the inlet end of a rinsing-water pipe 12. With this arrangement the rinsing process takes place by introducing raw water and air in an upward direction. On the other hand, the draining devices 4 and 9 are connected to the raw-water line 14 through stop valves 13, this arrangement being advantageous for solving supervision and control problems. The raw water line 14 is also connected through stop valve 15 to the aforesaid pipe line 10 directing one fraction of the pre-filtered water to the top of the upper fine-granulation filtering layer 6. The upper portion of the rinsing-water exhaust line 12 is connected to the pipe line 10 for delivering the pre-filtered waterstream fraction. The pipe 27 may also be used for rinsing.

Adjustable valves or cocks 17 are inserted in the raw-water supply line 14 and also in the aforesaid line 10 directing the partial pre-filtered stream to the top of the upper fine-granulation filtering layer 6. Adjustable valves inserted in the general adjustment or control circuit of the apparatus may be provided to this end, these valves controlling the water distribution among the upper and lower fine layers 5 and 6, the adjustment position of these valves being checked by means of suitable control units 18 for example in the form of output-meters and/or pressure gauges.

Thus, the whole of the raw water will be delivered through the manifold 3 into the filter 1 of this invention. The valves 13 and 15 are closed. The pre-filtration step takes place through the lowermost or coarse-granulation layer 2. Of course, under normal service conditions the stop disks 16 are removed. One fraction of the water stream is directed through the lower draining device 9 and pipe line 10 to the top surface of the upper fine-granulation filtering layer 6. The fragmentary streams flowing through the fine-granulation filtering layers 5 and 6 both upwards and downwards are removed through the upper pure-water draining device 4. The valves 13 and 15 are used for back-rinsing the draining devices 4 and 9. This back-rinsing operation takes place in an upward direction by using of raw water and air, as already explained hereinabove.

Figure 3:
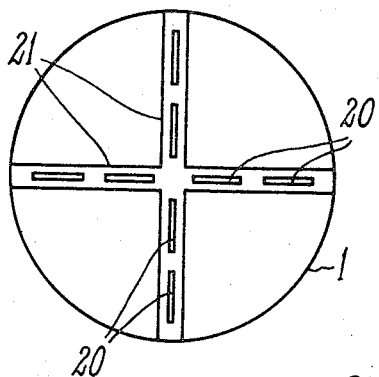
FIGURE 3 is a horizontal section taken across the apparatus of FIGURE 1 at the level of a draining manifold.

Both draining devices 4 and 9 may be constructed in various known forms of embodiment. Thus, as shown in FIGURE 3, a cross-like draining device may advantageously be used which consists of a pair of tubes 21 disposed crosswise and having a great number of slits 20 formed therein through which the filtered and pre-filtered water can penetrate into these draining tubes 21.

Figure 4:
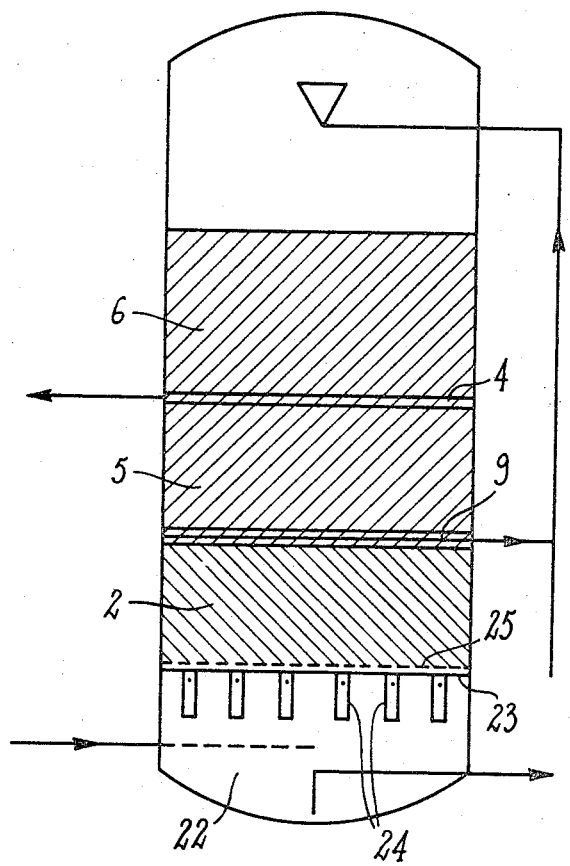
FIGURE 4 shows a modified form of embodiment of the apparatus.

FIGURE 4 illustrates a modified form of embodiment of the filter of this invention, which is particularly suitable for treating waters likely to carry relatively coarse impurities. In this case the coarse-granulation filtering layer 2 is preceded by a settling chamber 22 provided with means for delivering raw water in tangent directions into this chamber. The aforesaid coarse impurities are thus deposited in this settling chamber, this action being facilitated by a cyclone effect resulting from the tangential arrangement of the raw water inlets. The thus deposited impurities may be evacuated through a hand or bottom hole, or any other suitable means provided in the bottom of this chamber 22. In combination with this arrangement it may be advantageous to provide an intermediate bottom member 23 supporting through a mechanical sieve 25 the coarse-granulation filtering layer 2. On the other hand, the intermediate bottom member 23 may be provided with nozzles 24 directed towards the settling chamber 22. These nozzles 24 are formed with gauged orifices to ensure a uniform distribution of the rinsing air during the filter rinsing operation.

Although the filter according to this invention has been referred to as a water filter, it would not constitute a departure from the spirit and scope of this invention to operate this filter with fluids other than water, since the present invention is applicable to all fluids requiring a filtering treatment of the type obtaining with a filter of this character.

What I claim is:

1. Filter for filtering water, comprising a housing, a lower, coarse-granulation layer in said housing having a raw-water supply manifold, two superposed fine-granulation filtering layers overlying said coarse-granulation layer, a first draining device located between said two fine-granulation filtering layers for removing the filtered water with the water to be filtered flowing in counterflow through said fine-granulation filtering layers, said raw-water supply manifold having an inlet to said housing for the water to be filtered beneath said coarse-granulation filtering layer, a second draining device associated with said coarse-granulation layer, a pipe line connected to said second draining device for delivering one fraction of the pre-filtered water from said coarse-granulation layer to the top of the upper one of said two fine-granulation filtering layers, the remaining portion of said pre-filtered water flowing directly through the lower one of said two fine-granulation filtering layers.

2. Filter according to claim 1 wherein said fine-granulation filtering layers consist of filtering sand having a homogeneous particle size.

3. Filter according to claim 1 wherein said second draining device is disposed in the interface between said coarse-granulation filtering layer and the lower one of said two fine-granulation filtering layers.

4. Filter according to claim 1 wherein nozzles for delivering back-rinsing air are disposed beneath said coarse-granulation filtering layer, and a rinsing-water outlet is provided above said upper one of said fine-granulation filtering layers.

5. Filter according to claim 1 wherein an air exhaust pipe is connected to the bottom of said housing.

6. Filter according to claim 1 wherein said draining devices are connected with the interposition of stop valves to said raw-water supply manifold.

7. Filter according to claim 1 wherein said raw-water supply manifold is connected with the interposition of stop valves to said pipe line.

8. Filter according to claim 1 wherein a rinsing water outlet pipe with a stop valve is connected upstream of said pipe line.

9. Filter according to claim 1 wherein adjustable valves are inserted in the raw-water supply line and in said pipe line.

10. Filter according to claim 1 wherein control means are inserted in the raw-water supply line and in said pipe line.

11. Filter according to claim 1 wherein a settling chamber is arranged upstream of said coarse-granulation filtering layer and is provided with tangent raw-water inlet means.

12. Filter according to claim 11 wherein said settling chamber is separated from said coarse-granulation filtering layer by an intermediate bottom member having tubular nozzles to act upon said settling chamber.

13. Filter according to claim 12 wherein said tubular nozzles are directed towards the interior of said settling chamber.

14. Filter according to claim 12 wherein a mechanical sieve is disposed on the top of said intermediate bottom member.

15. Filter according to claim 12, wherein said tubular nozzles have gauged orifices to ensure a uniform distribution of the rinsing air.

No references cited.

SAMIH N. ZAHARNA, *Primary Examiner.*